Aug. 24, 1937. A. MILLER ET AL 2,091,243
HYDRAULIC BRAKE FLUID DISTRIBUTOR
Filed May 23, 1936 2 Sheets-Sheet 1

INVENTORS,
ADOLPH MILLER,
JOHN SEARS.

BY David W. Gould.
ATTORNEY

Aug. 24, 1937.  A. MILLER ET AL  2,091,243
HYDRAULIC BRAKE FLUID DISTRIBUTOR
Filed May 23, 1936   2 Sheets-Sheet 2

INVENTORS,
ADOLPH MILLER,
JOHN SEARS.

BY David W. Gould
ATTORNEY

Patented Aug. 24, 1937

2,091,243

UNITED STATES PATENT OFFICE 2,091,243

HYDRAULIC BRAKE FLUID DISTRIBUTOR

Adolph Miller and John Sears, Regina, Saskatchewan, Canada

Application May 23, 1936, Serial No. 81,520
In Canada April 21, 1936

6 Claims. (Cl. 303—84)

This invention relates to a hydraulic brake fluid distributor and the principal object of our invention is to provide a distributor for the brake fluid, which distributor is so formed that the fluid to and controlling the respective brake actuating means of, for example, the four wheels of an automobile is individually under control, irrespective of whether the fluid to the other respective brakes is in operative condition or not.

A further object of our invention is to provide individual reservoirs for automatically keeping the brake fluid supply of each independent brake fluid operating means filled to normal capacity.

A further object is to provide a hydraulic brake fluid distributor, with objects as above set forth, and characterized in that the distributor, the distributor pipe therefrom to the respective brake actuating means and the actuating means themselves may be bled or drained by one common means.

A further object of our invention is to provide a hydraulic brake fluid distributor, in which is provided pressure-forming chambers for each brake actuating means, which pressure-forming chambers are independent of each other but the pressure therein is controlled from a common master operating pressure-forming means.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application, in which:—

Like numerals of reference designate corresponding parts throughout the different views.

Figure 1:
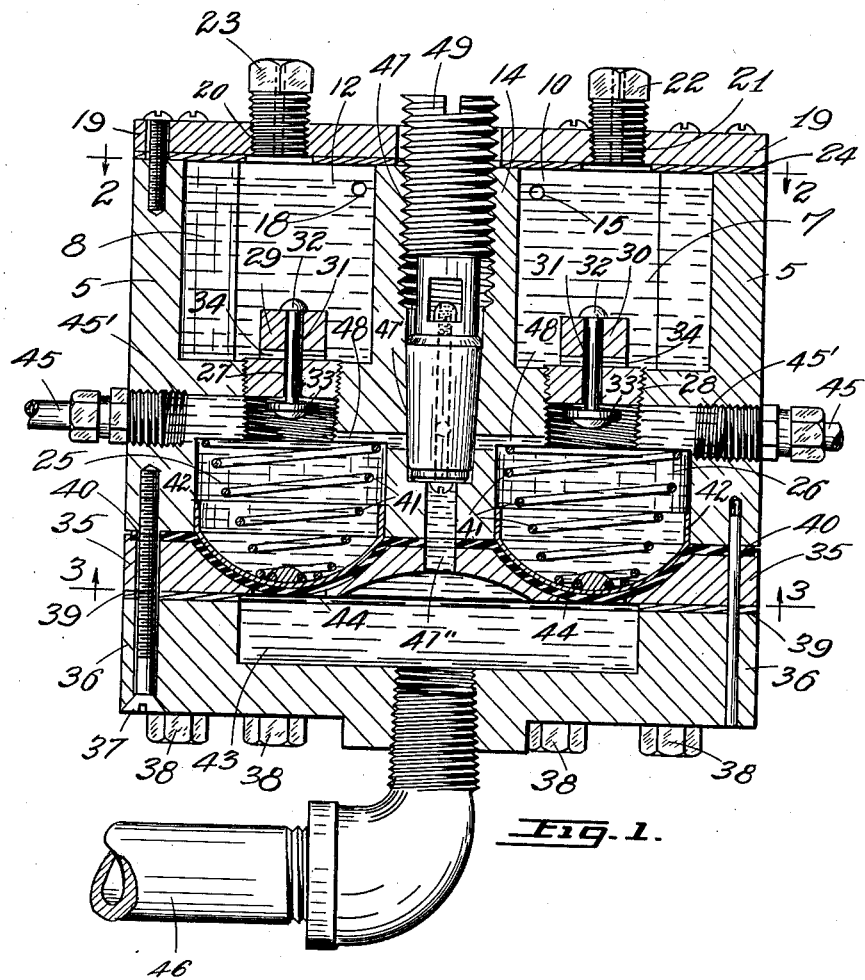
Fig. 1 is a vertical transverse sectional view of the preferred embodiment of our hydraulic brake fluid distributor.
Figure 2:
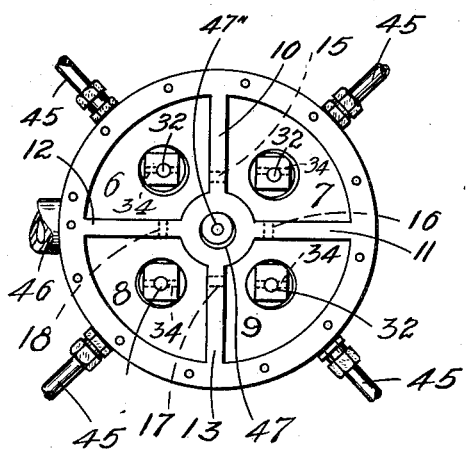
Fig. 2 is a top plan view of our hydraulic brake fluid distributor, taken on the line 2—2 of Fig. 1.
Figure 3:
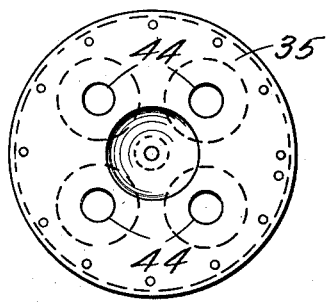
Fig. 3 is a transverse sectional view of our hydraulic brake fluid distributor as taken on the line 3—3 of Fig. 1.
Figure 4:
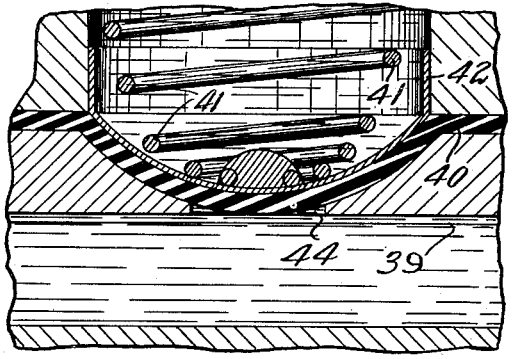
Fig. 4 is an enlarged detail view of a portion of one of the pressure-forming chambers and associate parts therewith.

5 is the body portion of our hydraulic brake fluid distributor, which body portion is preferably annular in outer contour and has the interior portions thereof formed as an integral unit as hereinafter set forth. The upper portion of our distributor is provided with four brake fluid reservoirs 6, 7, 8, and 9, which are separated by partitions 10, 11, 12 and 13 extending between the outer wall of the body portion 5 and the central column 14. The partitions 10, 11, 12, and 13 are preferably provided with intercommunicating ports 15, 16, 17, and 18, which are formed preferably adjacent the upper edges thereof. The body portion 5 is provided with a cover plate 19, which cover plate is provided with filling openings 20 and 21, which openings are closed by threadedly engaged plugs 22 and 23. If desired, the plugs 22 and 23 may be provided with breather ports. A suitable gasket is positioned and retained between the upper face of the body portion 5 and the lower face of the cover plate 19.

The lower portion of the body portion 5 is provided with four pressure-forming chambers 25 and 26, only two of which it is possible to illustrate in Fig. 1. Each of these pressure-forming chambers are preferably formed directly under its respective brake fluid reservoir 6, 7, 8, and 9, and there is provided a communicating passage therebetween as at 27 and 28 respectively. 29 and 30 are plugs threadedly engaged to close the intercommunicating passages 27 and 28 respectively. Each plug is provided with a vertical opening 31, which opening is sufficiently large to permit the valve shafts 32 to be positioned therein and yet permit brake fluid to flow therethrough. Each valve shaft 32 is slightly longer than the length of the plugs 29—30 and are capped at their respective ends, their lower ends being provided with valve washers 33 of suitable material to provide a closure when the valve 32—33 is forced upwardly against the lower face of the plugs 29—30 by pressure exertion in the pressure-forming chambers 25—26. The plugs 29—30 have transverse ports 34 communicating through the vertical openings 31, so that brake fluid from the reservoirs 6, 7, 8, and 9 may gravitate therefrom to retain a full supply of such brake fluid in their pressure-forming chambers and their respective associate brake fluid pipe lines and brake actuating means. 35 is a pressure-forming chamber plate and 36 is a head plate, both of which are retained against the under face of the body portion 5 by means of a plurality of spaced screws 37 and bolts 38. A gasket 39 is positioned between the pressure-forming chamber plate 35 and the head plate 36. 40 is a diaphragm, the flat portion of which acts as a gasket between the lower face of the body portion 5 and the body portion of the pressure-forming chamber plate 35. The portions of the diaphragm 40, adapted to register opposite the respective pressure-forming chambers 25—26 and the other two not shown, are formed concaved to snugly fit down into the concaved pockets formed in the pressure-forming chamber plate 35 and which register opposite the pressure-forming chamber 25—26 and the two similar chambers not shown. Each pressure-forming chamber is provided with a coiled expansion spring 41, the upper end of which bears against the under face of the body portion 5 in the respective pressure forming chambers and the lower end of the expansion spring bears against its respective pressure cup or piston 42, the cup or piston 42 being preferably formed with a cylindrical upper sleeve to reciprocate snugly in its pressure-forming chamber, while the lower portion thereof is concaved to normally fit snugly against a concaved portion of the diaphragm 40. Each spring 41 and piston 42 will normally retain its concaved portion of the diaphragm 40 in downwardly pressed relationship against the face of the convex pockets formed in the pressure-forming chamber plate 35. If desired, the diaphragm 40 may be formed in a plurality of parts instead of one unit.

The head plate 36 is provided with a master pressure-forming chamber 43, with ports 44 therefrom extending through the pressure-forming chamber plate 35 to the respective pressure-forming chambers 25—26 and the two not shown. Upon pressure being exerted, through the pressure fluid in the master pressure-forming chamber 43, the fluid therein will exert independent pressure on the outer face of each of the concaved portions of the diaphragm 40; their respective pistons 42; the respective fluids therein and the fluids in their respective pipe lines 45, through the pipe ports 45' in said body portion 5, to their respective brake actuating means. A pressure control pipe 46 communicates between the master pressure-forming chamber 43 and any desired means, such as a foot brake or lever control and their associate parts.

Extending down through the column 14, body 5 and pressure-forming chamber plate 35, we provide a bleeder opening 47. The central portion of the bleeder opening 47 is tapered as at 47' and the lower portion is of smaller diameter as at 47''. 48 are by-passes from the communicating passages 27—28 and the two not shown to the bleeder opening 47. 49 is a plug, threadedly engaged at its upper end, in the bleeder opening 47. The lower end of the plug 49 is preferably separate from the upper portion and provided with any interconnecting means whereby the lower portion will not be rotated upon rotation of the upper threaded portion of the plug 49. This lower portion is of frusto-conical shape to fit the tapered portion 47' and close the inner ends of the by-passes 48 and the upper end of the smaller opening 47''.

The foregoing specification and annexed drawings disclose the preferred embodiment of our invention, but it is to be understood that minor changes may be resorted to in the commercial adaptation of our invention without departing from the scope of the invention as hereinafter claimed.

What we claim as new is:

1. A hydraulic brake fluid distributor comprising a body portion, a removable cover plate, a removable pressure forming chamber plate and a head plate, said body portion having formed therein a plurality of pressure forming chambers, each of said chambers being provided with a fluid reservoir formed in said body portion and having valve controlled intercommunication between said reservoir and its respective pressure forming chamber, said head plate having formed therein a master pressure forming chamber, communication opening from said master pressure forming chamber to said pressure forming chambers, a plurality of pipe lines from said body portion for communication to a plurality of brake actuating means, intercommunication openings in said body portion between said pressure forming chambers and their respective pipe lines connected to said body portion, and a pressure control pipe communication with said master pressure-forming chamber.

2. A hydraulic brake fluid distributor comprising a body portion, a removable cover plate, a removable pressure forming chamber plate, a head plate, said body portion having formed therein a plurality of pressure forming chambers, a diaphragm between said body portion and said pressure forming chamber plate, which diaphragm is provided with concaved portions, one of which portions is adapted to register opposite each of said pressure forming chambers, a piston reciprocally mounted in each of said pressure forming chambers, a means for resiliently pressing said piston and its respective concave portion in said diaphragm into oppositely registering cavities formed in said pressure forming chamber plate, said head plate having formed therein a master pressure forming chamber, communication openings from said master pressure forming chamber to said pressure forming chambers, a plurality of pipe lines from said body portion for communication to a plurality of brake actuating means, intercommunication openings in said body portion between said pressure forming chambers and their respective pipe lines connected to said body portion, and a pressure control pipe communication with said master pressure forming chamber.

3. A hydraulic brake fluid distributor comprising a body portion, a removable cover plate, a removable pressure forming chamber plate, a head plate, said body portion having formed therein a plurality of pressure forming chambers, said head plate having formed therein a master pressure forming chamber, communication openings from said master pressure forming chamber to said pressure forming chambers, a plurality of pipe lines from said body portion for communication to a plurality of brake actuating means, intercommunication openings in said body portion between said pressure forming chambers and their respective pipe lines connected to said body portion, a pressure control pipe communicating with said master pressure forming chamber, a fluid reservoir in said body portion for each of said pressure forming chambers, said pressure forming chamber plate and said body portion being provided with interconnected passages between said pressure forming chambers and said master pressure forming chamber, so that said reservoirs and said master pressure forming chamber may be bled through a common outlet and a means for controlling the bleeding of the passages to said pressure forming chambers.

4. A hydraulic brake fluid distributor comprising a body portion having a central opening formed therein and chambers also formed therein around said central opening, said chambers being divided by a central partition into lower pressure forming chambers and upper reservoir chambers, means connecting said chambers, a cover plate covering the upper end of the reservoir chambers, a pressure forming chamber plate covering the lower end of said pressure forming chambers and a head plate secured to said pressure forming chamber plate and formed with a master pressure forming chamber, and means establishing connection between said master pressure forming chamber and said lower pressure forming chambers.

5. A hydraulic brake fluid distributor as claimed in claim 4 wherein the master pressure forming chamber is connected to said central opening to receive filling fluid.

6. A hydraulic brake fluid distributor as claimed in claim 4 wherein the connecting means between the master pressure forming chamber and the pressure forming chambers consists of a diaphragm adapted to transmit any pressure in the master chamber equally to the several lower pressure forming chambers.

ADOLPH MILLER.
JOHN SEARS.